(12) United States Patent
Kensrue (10) Patent No.: US 6,568,578 B1
(45) Date of Patent: May 27, 2003

(54) WELDING WIRE FEED MECHANISM

(75) Inventor: Milo M. Kensrue, Newport Beach, CA (US)

(73) Assignee: MK Products, Irvine, CA (US)

( * ) Notice: Subject to any disclaimer, the term of this patent is extended or adjusted under 35 U.S.C. 154(b) by 69 days.

(21) Appl. No.: 09/798,614

(22) Filed: Mar. 2, 2001

(51) Int. Cl.[7] .................. B65H 20/00; G03B 1/56; B23K 9/12
(52) U.S. Cl. .................. 226/176; 219/137.7; 226/90; 226/187
(58) Field of Search .................. 226/90, 176, 177, 226/187; 219/137.7

(56) References Cited

U.S. PATENT DOCUMENTS

| | | | | |
|---|---|---|---|---|
| 3,088,642 A | * | 5/1963 | Kingsley | 226/176 |
| 3,338,492 A | * | 8/1967 | Cornell, Jr. | 226/187 |
| 3,344,305 A | * | 9/1967 | Ogden | 219/137.7 |
| 3,430,832 A | * | 3/1969 | Meyer | 226/177 |
| 3,562,577 A | | 2/1971 | Kensrue | |
| 3,898,419 A | * | 8/1975 | Smith | 219/137.7 |
| 4,165,829 A | | 8/1979 | Koveshnikov et al. | |
| 4,206,862 A | | 6/1980 | DaCosta | |
| 4,235,362 A | * | 11/1980 | Hubenko | 226/187 |
| 4,404,457 A | | 9/1983 | Rokujio et al. | |
| 4,617,447 A | * | 10/1986 | O'Donohue | 219/137.7 |
| 4,954,690 A | | 9/1990 | Kensrue | |
| D329,179 S | | 9/1992 | Kensrue | |
| 5,326,958 A | | 7/1994 | Geus | |
| 5,586,709 A | * | 12/1996 | Del Fabro et al. | 226/177 |
| 5,738,264 A | * | 4/1998 | Jackson et al. | 226/177 |
| 5,782,394 A | | 7/1998 | Langley | |
| 5,816,466 A | * | 10/1998 | Seufer | 226/187 |
| 6,064,036 A | | 5/2000 | Kensrue | |
| 6,427,894 B1 | * | 8/2002 | Blank et al. | 226/177 |

* cited by examiner

*Primary Examiner*—Michael R. Mansen
(74) *Attorney, Agent, or Firm*—Knobbe, Martens, Olson & Bear, LLP.

(57) ABSTRACT

A wire feeding apparatus for providing filler wire to a welding gun or torch that includes a motor, a driver roll, an idler roll and a bias controller. The bias controller is configured to bias the wire contacting portion of the idler roll towards the wire contacting portion of the driver roller. The bias controller is preferably moveable between at least a first preset condition and a second preset condition. In the first preset condition, the bias controller produces a first engagement force on the portion of the filler wire that is located between the wire contacting portions of the idler roll and the driver roll. In the second preset condition, the bias controller produces a second engagement force on the portion of the filler wire that is located between the wire contacting portions of the idler roll and the driver roll. Preferably, the first engagement force is greater than the second engagement force. More preferably, the bias controller is also moveable to a third preset condition, wherein the idler roll is distanced from the driver roll. In a modified arrangement, the bias controller can move only between the first preset condition and the third preset condition.

28 Claims, 10 Drawing Sheets

WELDING WIRE FEED MECHANISM

BACKGROUND OF THE INVENTION

1. Field of the Invention

The present invention relates to a feeding mechanism for feeding filler wire to a welding torch or gun, and more particularly to an improved device for adjusting an engagement pressure within the feeding mechanism.

2. Description of the Related Art

Materials can be joined together by welding or brazing them together with a filler material, such as, for example, steel or aluminum wire (i.e., "filler wire"). This typically involves the use of a welding machine (e.g., an arc welding gun or torch) to melt the filler wire at the junction of the two materials that are to be joined. To produce a strong and reliable weld, it is important that the filler wire be supplied smoothly and continuously to the welding gun. Typically, the filler wire is provided to the welding gun through a conduit, which is connected to a remote wire-feeding unit. Within the wire-feeding unit, the filler material is typically coiled about a reel, which is rotatably mounted within the unit.

There are several systems for delivering the filler wire in the wire-feeding unit to the welding gun. For example, in a pull-type feed system, the welding gun includes a feeding mechanism that pulls the wire from the wire-feeding unit. In a push-type feed system, the wire-feeding unit includes a feeding mechanism, which pulls the wire from the reel and then pushes the wire through the conduit towards welding gun. A push-pull type feed system utilizes a feeding mechanism in both the welding gun and the wire-feeding unit.

The push-pull type feed systems are generally preferred because of their superior performance. As mentioned above, these system typically include a feeding mechanism in both the welding gun and the wire-feeding unit. These feeding mechanisms typically include a motor, an idler roll and a drive roll, which is driven by the motor. The filler wire passes through the space between the driver roll and the idler roll. Preferably, the idler roll is provided with an adjustment mechanism for adjusting the engagement pressure between the idler roll and the drive roll.

The motor in the wire-feed cabinet is typically referred to as a "slave motor", while the motor in the welding torch is typically referred to as a "gun motor". Typically, the slave motor is a torque motor or a torque-type motor, which runs at a higher speed, but lower torque than the gun motor. The gun motor is typically a DC motor, which runs at a lower speed than the slave motor, but operates at a higher torque. As such, the feeding mechanism in the wire-feed cabinet is always trying to provide filler wire at a faster rate than the feeding mechanism in the welding gun. However, because the wire feeding mechanism in the welding gun is controlling the rate of wire feed, the column strength of the filler wire in the conduit controls the slave motor. Thus, the two wire feeding mechanisms operate at the same speed, which reduces the tendency of the filler wire to bind and/or compress within the conduit.

In order for the push-pull system to work properly, it is important that the engagement pressure between the idler roll and the driver roll in the wire-feed unit be adjusted properly. As mentioned above, the idler roll can be provided with an adjustment mechanism for adjusting the engagement pressure. An example of such an adjustment mechanism can be found in U.S. Pat. No. 6,064,036. The disclosed idler roll is secured to a pivot arm. A bolt and spring hold the arm in place during the welding process and bias the idler roll against the drive roll. The engagement pressure can be adjusted by tightening the bolt and changing the distance between the bolt and the pivot arm. In this manner, the engagement pressure can be adjusted by compressing or decompressing the spring.

This method of adjusting the engagement pressure has several disadvantages. For example, to find the proper position of the bolt, the operator typically routes the filler wire between the driver roll and the idler roll in the wire-feed unit. The operator then must prevent the wire spool from turning with the palm of one hand while at the same time grasping the bolt. With his other hand, the operator must actuate a trigger on the welding gun to operate the feed mechanism. The operator slowly tightens the bolt and increases the engagement pressure until the slave motor stalls. At this condition, the engagement pressure is proper and the wire does not slip even if a small amount of pressure is added to the wire as it exists the welding gun. If the engagement pressure is too small, the drive roll slips on the filler wire. If the engagement pressure is to large, the idler roll can cut into the wire causing excessive wire residue buildup. Too much engagement pressure also tends to flatten and deform the shape of the wire.

The method described above for adjusting the engagement pressure is time consuming, involves a relatively high level of dexterity and is subject to human error. Moreover, when the type of filler wire or wire sized is changed (e.g., from aluminum to steel), the engagement pressure must be readjusted. The engagement pressure must be readjusted because steel wires typically result in a higher column strength, as compared to aluminum wires) in the conduit. Moreover, steel wires tend to be harder than aluminum wires. As such, the engagement force should be larger for steel wires as compared to aluminum wires.

SUMMARY OF THE INVENTION

Accordingly, one aspect of the present invention involves a welding filler wire feed apparatus for feeding filler wire to a welding gun. The apparatus comprises a main frame and a secondary frame configured to move relative to said main frame. A first wheel is supported by the main frame and defines a first surface for contacting a first side of a filler wire. A second wheel is supported by the second frame and defines a second surface for contacting a second side of the filler wire. The second surface generally opposes the first surface. A motor is connected to at least one of the first wheel and the second wheel so as to selectably drive the at least one of said first wheel and said second wheel. A bias controller that includes a first resilient portion that biases the secondary frame such that the second surface is biased towards the first surface. The bias controller having a first preset position and a second preset position. In the first preset position, the first resilient portion exerts a first force on the secondary frame and in the second preset position, the first resilient portion exerts a second force on said secondary frame. The first force is greater than said second force.

Another aspect of the of the present invention involves a welding filler wire feed apparatus for feeding filler wire to a welding gun. The apparatus comprises a source of filler wire, a drive wheel, a motor, and a idler wheel. The drive wheel defines a first surface for contacting a first side of the filler wire. The motor is connected to the drive wheel so as to selectably drive the drive wheel. The idler wheel defines a second surface that is generally opposed to the first surface and contacts a second side of the filler wire. A portion of the filler wire is located between the first surface and the second surface. A bias device includes a first resilient portion positioned along a shaft. The resilient portion is configured to bias the idler wheel towards the driver wheel. The bias device further includes means for occupying a first distance on the shaft in the biasing direction so as to force the resilient portion to assume a first preset length and occupying a second distance on the shaft in the biasing direction so as to force the resilient portion to assume a second length.

Yet another aspect of the present invention involves a welding filler wire apparatus comprising a frame, a first drive section, a second drive section, a motor, a bias member and an actuator. The first drive section is mounted on the frame and defines a first drive surface for contacting a first side of the filler wire. The second drive is moveably mounted on the frame and defines a second drive surface for contacting a second side of the filler wire. The motor moves at least one of the first drive section and the second drive section. The biasing member is coupled to either of the first drive section or the second drive section. The biasing member exerting a biasing forcing in a biasing direction. The actuator connected to an adjustable spacer. The actuator has a first predetermined position and a second predetermined position. The adjustable spacer is coupled to the actuator and configured such that when the control is in the first position, the adjustable spacer occupies a first amount of space in the biasing direction to force the biasing member to assume a first length so as to exert a first force on at least one of the first drive section and the second drive section. When the actuator is in the second position, the adjustable spacer occupies a second amount of space in the biasing direction to force the biasing member to assume a second length so to exert a second force on at least one of the first drive section and the second drive section.

Still yet another aspect of the present invention involves a welding filler wire apparatus comprising a first frame, a second frame, a first drive section, a second drive section, a motor and a biasing member. The second frame is movable with respect to the first frame. The first drive section defines a first drive surface for contacting a first side of the filler wire. The second drive section defines a second drive surface for contacting a second side of the filler wire. The motor moves at least one of the first drive section and the second drive section. The biasing member acts on one of the first frame and the second frame and mounted on a shaft. An adjustable spacer is also mounted on the shaft. The adjustable spacer has a control to move the adjustable spacer between a first predetermined position and second predetermined position. When the control is in the first position, the biasing member is forced to assume a first length to exert a first force on at least one of the first wheel and the second wheel. When the control is in the second position, the biasing member is forced to assume a second length to exert a second force on at least one of the first wheel and the second wheel.

Another aspect of the present invention involves a welding filler wire feed apparatus for feeding filler wire to a welding gun. The apparatus comprises a main frame, a secondary frame, a first wheel, a second wheel, a motor, and a bias controller. The secondary frame configured to move relative to the main frame. The first wheel defines a first surface for contacting a first side of a filler wire. The first wheel being supported by the main frame. The second wheel defines a second surface for contacting a second side of the filler wire. The second surface generally opposes the first surface. The second wheel is supported by the secondary frame. The motor is connected to at least one of the first wheel and the second wheel so as to selectably drive the at least one of the first wheel and the second wheel. The bias controller includes a first resilient portion that biases the secondary frame such that the second surface is biased towards the first surface. The bias controller having a first preset position and a second preset position. In the first preset position the resilient portion exerts a first force on the secondary frame such that a first engagement force is created between the first surface and the second surface. In the second position, the first surface is distanced from the second surface.

All of these embodiments are intended to be within the scope of the invention herein disclosed. These and other embodiments of the present invention will become readily apparent to those skilled in the art from the following detailed description of the preferred embodiments having reference to the attached figures, the invention not being limited to any particular preferred embodiment(s) disclosed.

DETAILED DESCRIPTION OF THE PREFERRED EMBODIMENT

Figure 1A:
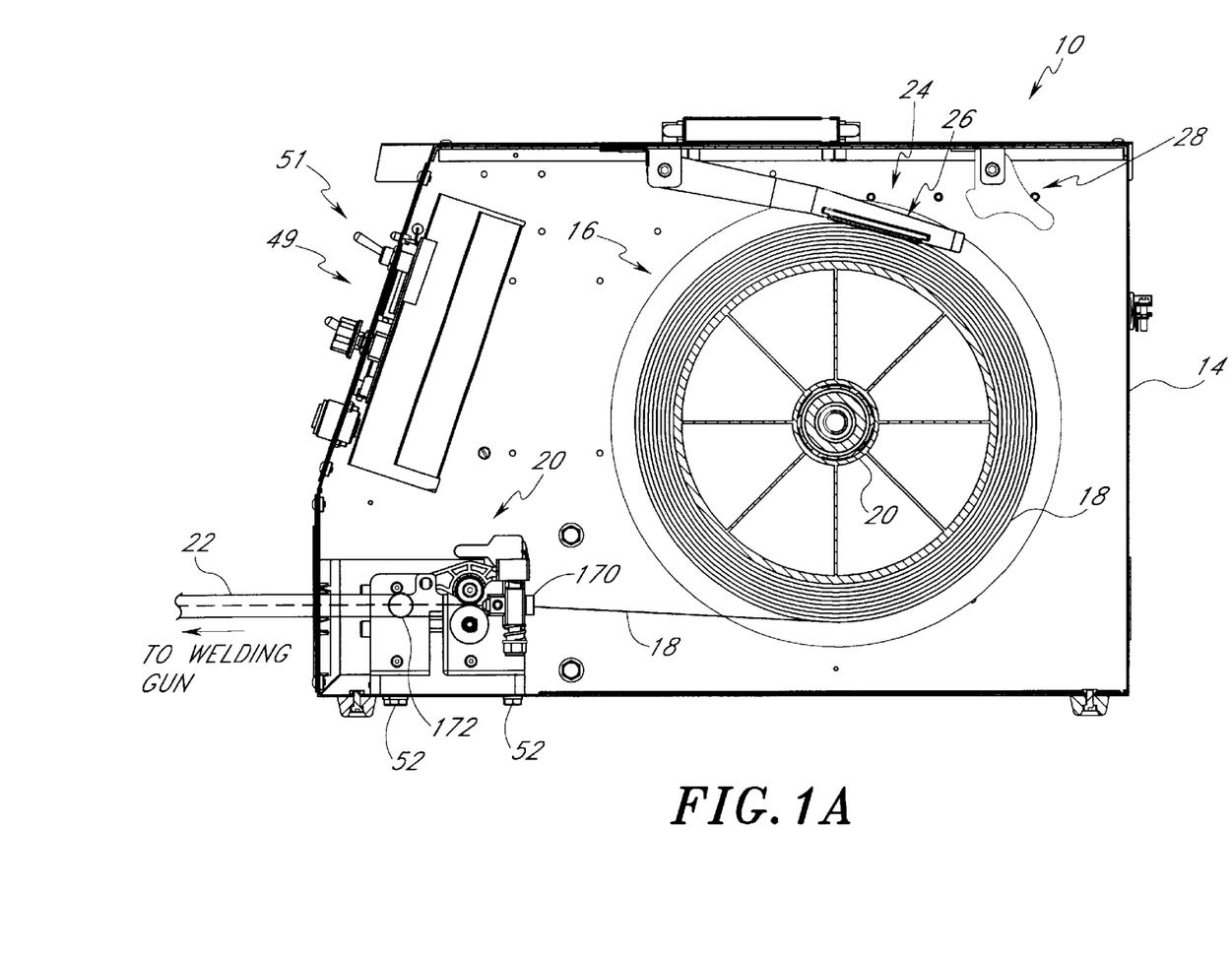
FIG. 1A is a schematic cross-sectional view of a wire feeding unit, which includes a wire feeding apparatus having certain features and advantages according to the present invention.

FIG. 1A illustrates a wire feeding unit 10, which includes a wire feeding apparatus 12 that has certain features and advantages according to the present invention. The illustrated wire feeding unit 10 includes a cabinet or housing 14. Preferably, a spool 16 containing filler wire 18 is rotatably mounted on a spindle 20, which, in turn, is suitably secured within the cabinet 14 via a bracket or frame member (not shown). A bolt (not shown) releasably holds the spool 16 on the spindle 20.

Figure 1B:
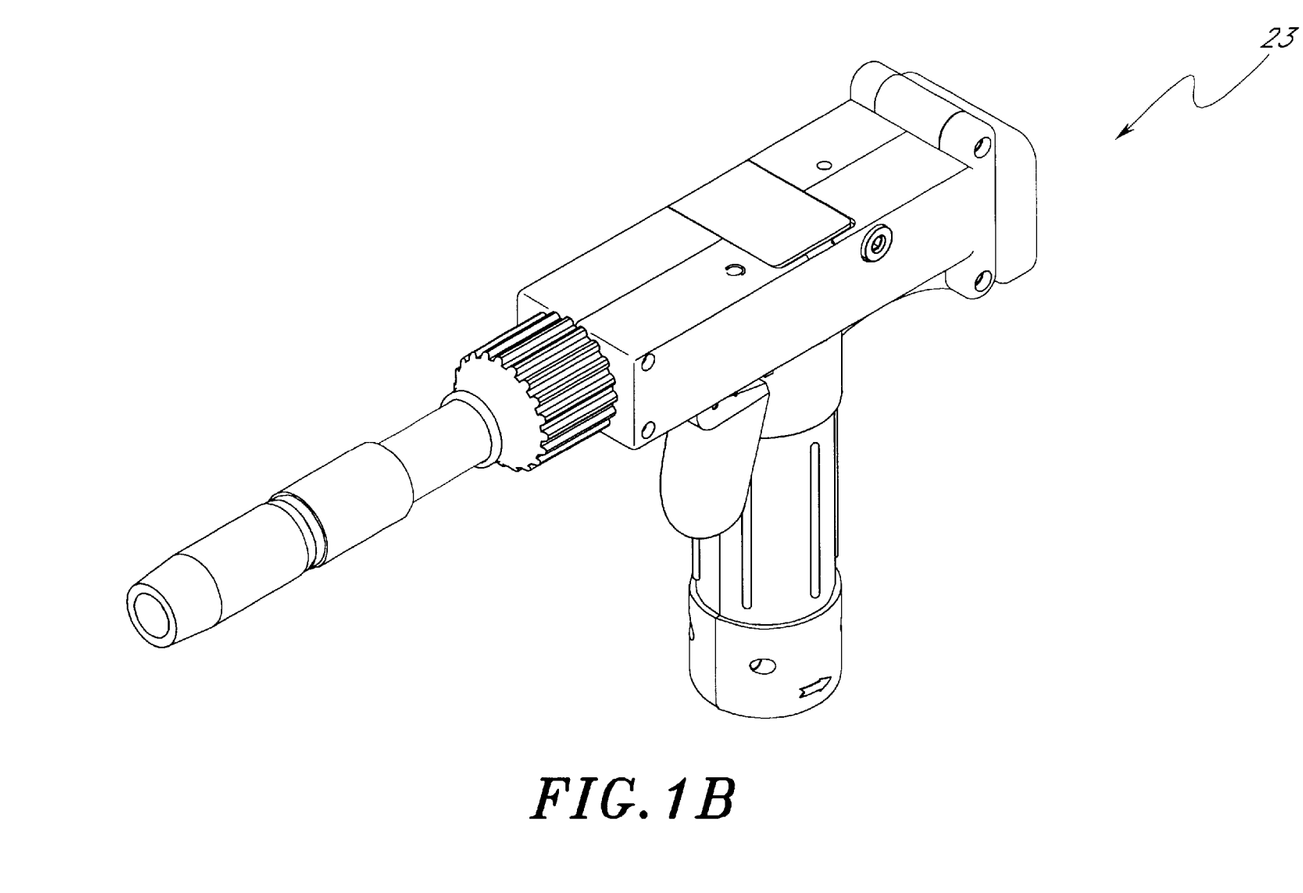
FIG. 1B is a perspective side view of a welding torch that can be used with the wire feeding unit of FIG. 1B.

The wire 18 is pulled from the spool 16 via the wire feeding apparatus 12, which will be described in more detail below. The wire feeding apparatus 12 pushes the wire 18 through a conduit 22. The conduit 22, in turn, is connected to a remoteably located welding gun 23 such as the one illustrated in FIG. 1B and described in U.S. Pat. No. 5,728,995, which is hereby incorporated herein by reference. The welding gun 23 preferably is equipped with a separate wire feeding apparatus (not shown), of any know type, for pulling the wire 18 through the conduit 22.

The wire feeding apparatus 12 preferably further comprises a wire position regulator 24, which, in the illustrated arrangement, is pivotably mounted to the cabinet 14 above the spool 16. The distal end 26 of the wire position regulator 24 is biased against the outmost layer of the wire 18 by a torsional spring (not shown). The wire position regulator 24 prevents the wire 18 from becoming tangled and is described in greater detail in U.S. Pat. No. 6,064,036, which is hereby incorporated herein by reference. A spring loaded pawl 28 is mounted to the cabinet 14 and releasably retains the distal end 26 of the wire position regulator 24 clear of the spool 18 to facilitate spool replacement.

Figure 2:
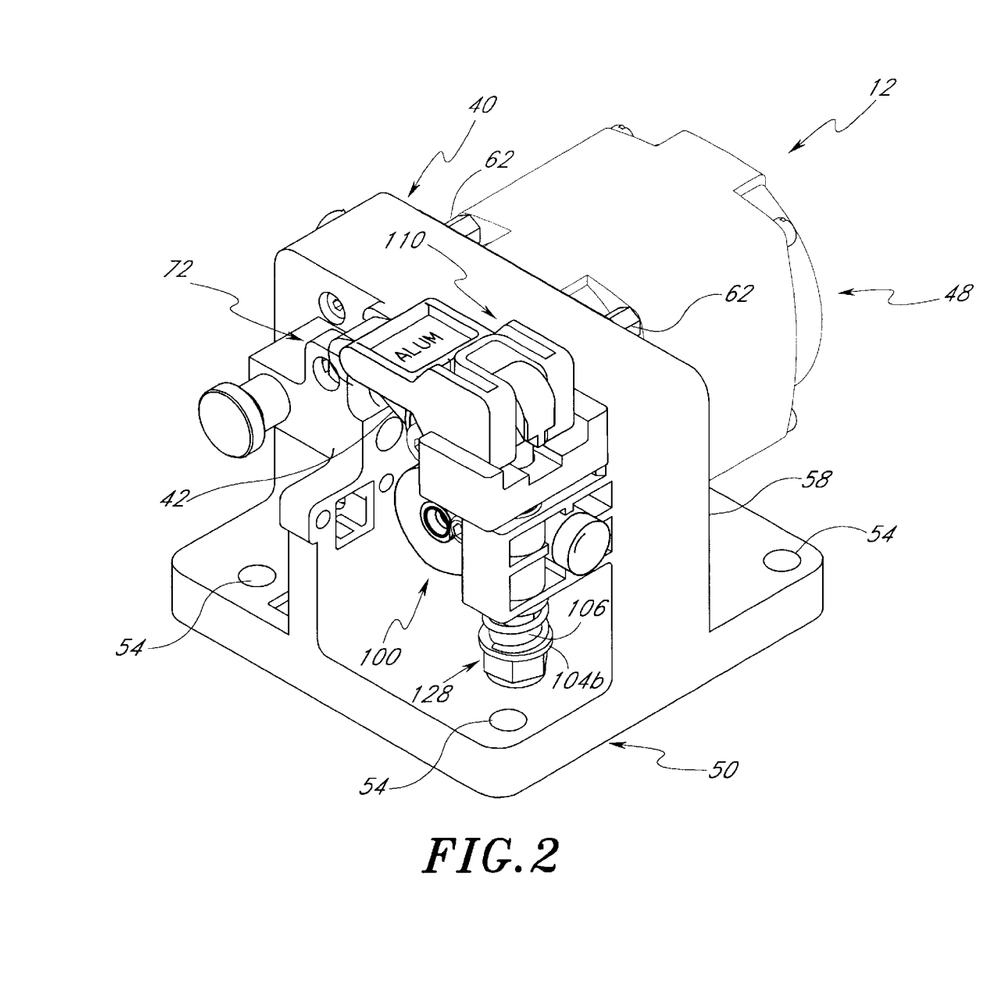
FIG. 2 is a perspective side view of the wire feeding apparatus of FIG. 1A.
Figure 3:
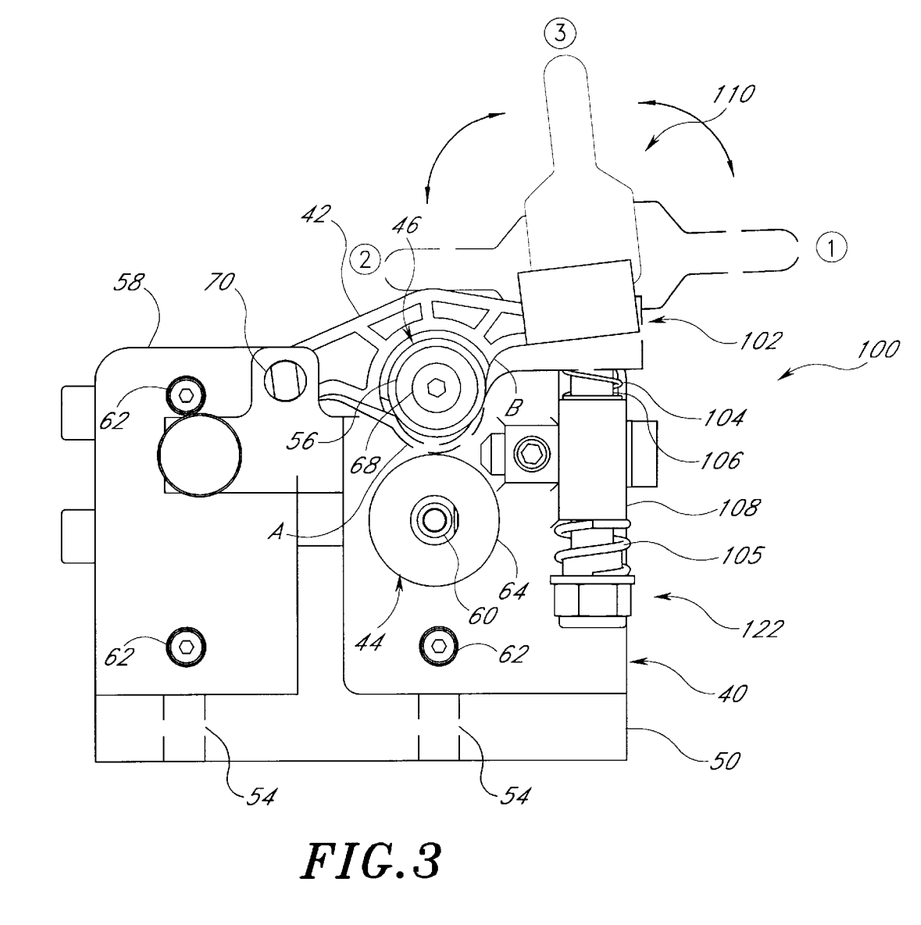
FIG. 3 is a side view of the wire feeding apparatus of FIG. 1A.

With reference now to FIGS. 2 and 3, the wire feeding apparatus 12 will now be described in detail. The illustrated wire feeding apparatus 12 comprises a main frame 40, a secondary frame 42, a drive roll 44, a idler roll 46 and a motor 48. The main frame 40 preferably includes a base portion 50. The base portion 50 preferably is suitably secured to the cabinet 14. In the illustrated arrangement, the base portion 50 is secured to the cabinet via bolts 52 (see FIG. 1), which extend through bolt holes 54 formed in the base portion 50.

The main frame 40 preferably also includes a vertical portion 58, which in the illustrated arrangement is integrally formed with the base potion 50. The vertical portion 58 rotatably supports a drive shaft 60, which, in turn, is coupled to the drive roll 44. The drive shaft 60 is suitably journaled for rotation within the vertical portion 58 and is suitably coupled to an output shaft (not shown) of the motor 48. In a modified arrangement, the drive shaft can be the output shaft of the motor.

When the wire feeding apparatus 12 is associated with a push-push pull system, the motor 48 is preferably a torque or torque-type motor, which runs at a higher speed (e.g., about 25% higher), but lower torque (e.g., a torque of about 1 to 4 pound inches), than the corresponding motor (not shown) in the welding gun 23 (e.g., speed of about 300 to 1000 inches per minute and a torque of about 10 pound inches). Preferably, the motor 48 is also supported by and connected to the vertical portion 58 by a plurality of bolts 62 or in any other suitable manner. In the preferred arrangement, the motor 48 is capable of operating between at least a first torque condition, which preferably is about 1–1.5 pound inches, and a second torque condition, which preferably is about 4 pound inches. Preferably, the motor 48 is operatively connected to a control panel 49, which includes a switch 51 for switching the motor between the first and second torque conditions. The first torque condition is preferable for "soft" wires (e.g., aluminum wires with a diameter of about 0.030–0.035 inches) and the second condition is preferable "hard" wires (e.g., all other wires).

Figure 4:
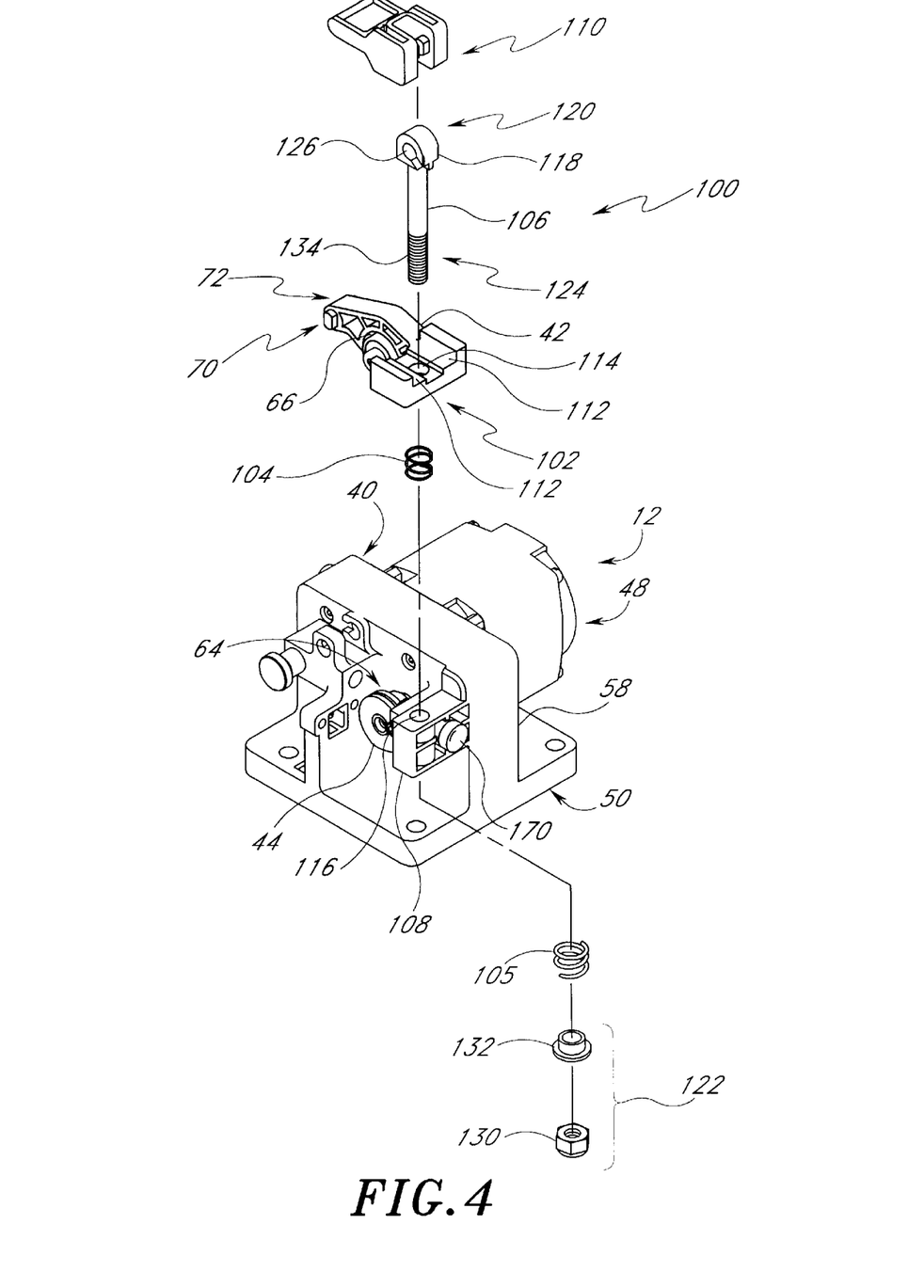
FIG. 4 is an partially exploded perspective side view of the wire feeding apparatus of FIG. 1A.

Preferably, the drive shaft 60 extends in a generally horizontal direction such that the drive roll 44 rotates about a generally horizontal axis. However, it should be appreciated that in modified arrangements the drive roll can be configured to rotate about other axes, such as, for example a generally vertical axis. The periphery of the driver roll 44 defines a drive surface 64 for contacting a first side of the filler wire 18. The drive surface 64 can be configured in a variety of different ways. For example, the drive surface 64 can be flat, serrated or knurled and/or formed into a V-shaped or U-shaped channel. As shown in FIG. 4, in the illustrated arrangement, the drive surface 64 is U-shaped. In a similar manner, the periphery of the idler roll 46 defines an idler surface 66 for contacting a second side of the filler wire 18. As with the drive surface, 64, the idler surface 66 can be configured in a variety of ways, such as, for example, flat, serrated or knurled and/or formed into a V-shaped or U-shaped channel. As shown in FIG. 4, in the illustrated arrangement the idler surface 66 is flat.

The secondary frame 42 rotatably supports the idler roll 46. For example, in the illustrated arrangement, the idler roll 46 is suitably journaled on an idler shaft 68, which is suitably supported by the secondary frame 42. The secondary frame 42, in turn, is preferably configured for movement relative to the main frame 40. More preferably, as best seen in FIG. 3, the secondary frame 42 is preferably configured to move between at least a first position, which is indicated by dashed lines that are labeled "A", and a second position, which is indicated by solid lines that are labeled "B". In the first position, a portion of the idler surface 66 preferably contacts a portion of the drive surface 64. In the second position, the idler surface 66 is located a distance from the drive surface 64. Preferably, this distance is large enough to facilitate threading the filler wire 18 between the drive roll 44 and the idler roll 46 and into the conduit 22.

To facilitate such movement, in the illustrated arrangement, the secondary frame 42 includes a pivot shaft 70 at a first end 72 of the secondary frame 42. The pivot shaft 70 is suitably journaled within the vertical portion 58 of the main frame 40. In a modified arrangement, the secondary frame can be slideably mounted within the main frame. In another modified arrangement, the secondary frame can be pivotably or slideably mounted on the cabinet or a mount mounted near or adjacent the main frame.

With reference to FIGS. 2–4, the wire feeding apparatus 12 includes a bias device, which is indicated generally by the reference number 100. The bias device 100 is configured to bias the wire contacting portion of the idler surface 66 towards the wire contacting portion of the driver surface 64. As will be explained in detail below, the bias device 100 is preferably moveable between at least a first preset condition and a second preset condition. In the first preset condition, the bias device 100 produces a first engagement force on the portion of the filler wire 18 that is located between the wire contacting portions of the idler surface 66 and the driver surface 64. In the second preset condition, the bias device 100 produces a second engagement force on the portion of the filler wire 18 that is located between the wire contacting portions of the idler surface 66 and the driver surface 64. Preferably, the first engagement force is greater than the second engagement force. More preferably, the bias device 100 is also moveable to a third preset condition, wherein the idler roll 46 is distanced from the driver roll 44 (i.e., the first position of FIG. 3) and no engagement force is applied to the filler wire 18. As will be explained below, this third or "open" position, facilitates threading the filler wire 18 through the wire feeding apparatus. In a modified arrangement, the bias device 100 can be moveable between the first position that produces a first engagement force and the open position in which the idler roll 46 is distance from the driver roll 44.

With particular reference to FIG. 4, the illustrated biasing device 100 preferably includes a second end 102 of the secondary frame 42, a first bias member 104, a second bias member 105, a shaft 106, a mount 108 and an adjustable spacer 110. The mount 108 can be integral with the main frame 40 (as illustrated), attached to the main frame 40 or separate from the main frame 40. The first and second bias members 104, 105 can be any type of biasing member, such as, for example, a rubber members, a compressible washers, a leaf spring, a helical spring, hydraulic members etc.

In the preferred arrangement, the second end 102 of the secondary frame 42 is located on the other side of the idler roll opposite the first end 72. The second end 102 preferably defines a contact surface 112. In the illustrated arrangement, the contact surface 112 is configured to contact a portion of the adjustable spacer 110 as will be described in more detail below. The second end 102 preferably also includes a through hole 114, which lies between two portions of the contact surface 112.

The shaft 106 is preferably configured to extend through the though hole 114 of the second end and a through hole 116 formed in the mount 108. In the illustrated arrangement, the mount 108 is connected to and supported by the main frame 40, however, in modified arrangements the mount 108 can supported by other members, such as, for example, the cabinet 14. The shaft 106 preferably includes a first stop 118 located a first end 120 of the shaft 106 and a second stop 122 located on a second end 124 of the shaft 106. In the illustrated arrangement, the first stop 118 forms an eyelet that defines a through hole 126, which pivotally supports the adjustable spacer 110 as will be described in more detail below. The second stop 122 preferably comprises by a nut 130 and washer 132, which are engaged with threads 134 provided on the second end 129 of the shaft 106. As will be explained in more detail below, this arrangement of the second stop 122 is preferred because it allows the distance between the second stop 122 and the first stop 118 to be adjusted by moving the nut 130 along the threads 134 of the shaft 106.

Figure 5:
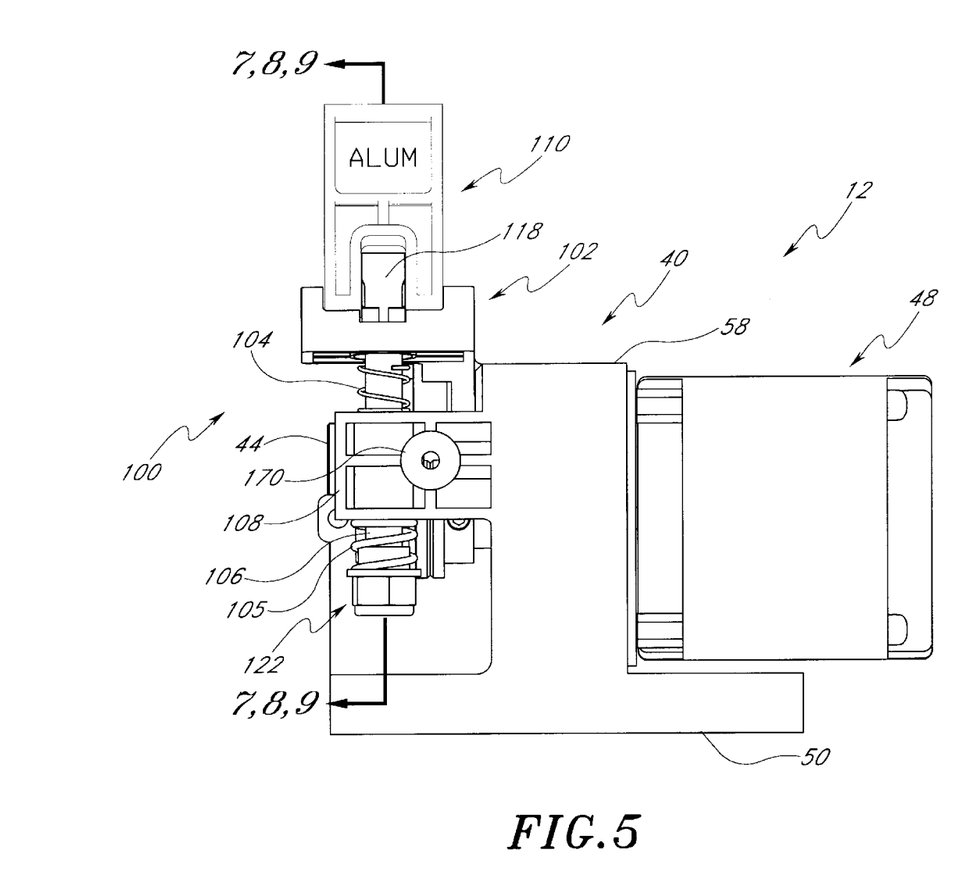
FIG. 5 is a front view of the wire feeding apparatus of FIG. 1A.
Figures 6A, 6F:
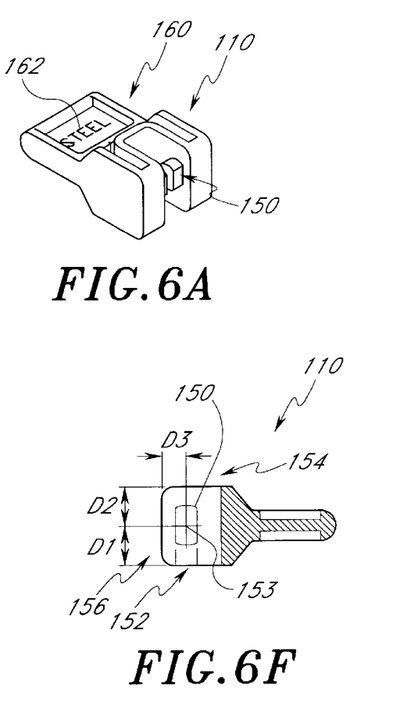
FIGS. 6A–F are perspective, top, left side, bottom, rear and cross-sectional views, respectively, of an adjustable spacer having of the wire feeding apparatus of FIG. 1A.
Figure 6B:
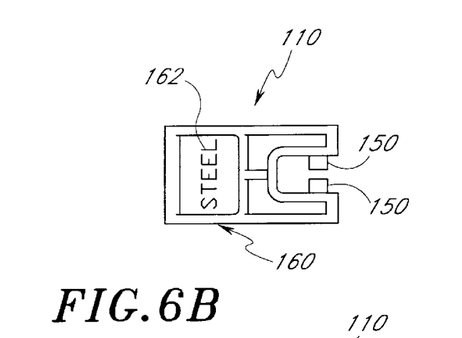
Figure 6C:
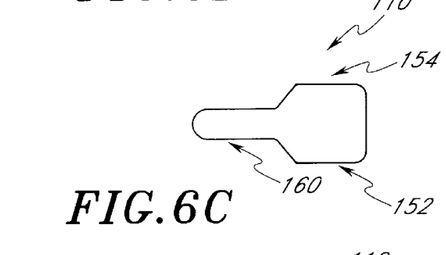
Figure 6D:
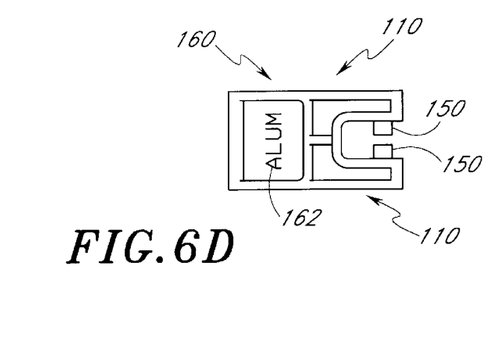
Figure 6E:
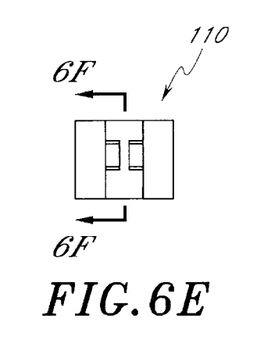

As best seen in FIGS. 3 and 5, in an assembled state, the shaft 106 extends through the second end 102 of the secondary frame 42 and the through hole 116 of the mount 108. The first biasing member 104, is preferably located between the mount 108 and the second end 102 of the secondary frame 42. The second biasing member 105 preferably is located between the mount 108 and the second stop 122.

With reference now to FIGS. 6A–D, the adjustable spacer 110 will be described in more detail. The adjustable space 110 is configured so as to occupy varying amounts of space along the shaft 106 in the general direction of the biasing force gestated by bias members 104, 105. In this manner, the adjustable spacer 110 can adjust the amount of force the bias members 104, 105 exert on the secondary frame 42 and thus the engagement force between the filler wire contacting surfaces 64, 66 of the driver roller 44 and the idler roller 46. Preferably, the adjustable spacer 110 is adjustable between at leas a first position (see FIG. 3, position labeled "1") wherein the bias device 100 produces the first engagement form and a second position (see FIG. 3, position labeled "2"), wherein the biasing device produces the second engagement force. Preferably, the first engagement force is greater than the second engagement force. Most preferably, the first engagement force is particularly suitable for steel or other similar type filler wire and the second engagement force is particularly suitable for aluminum or other similar type filler wire.

Figure 7:
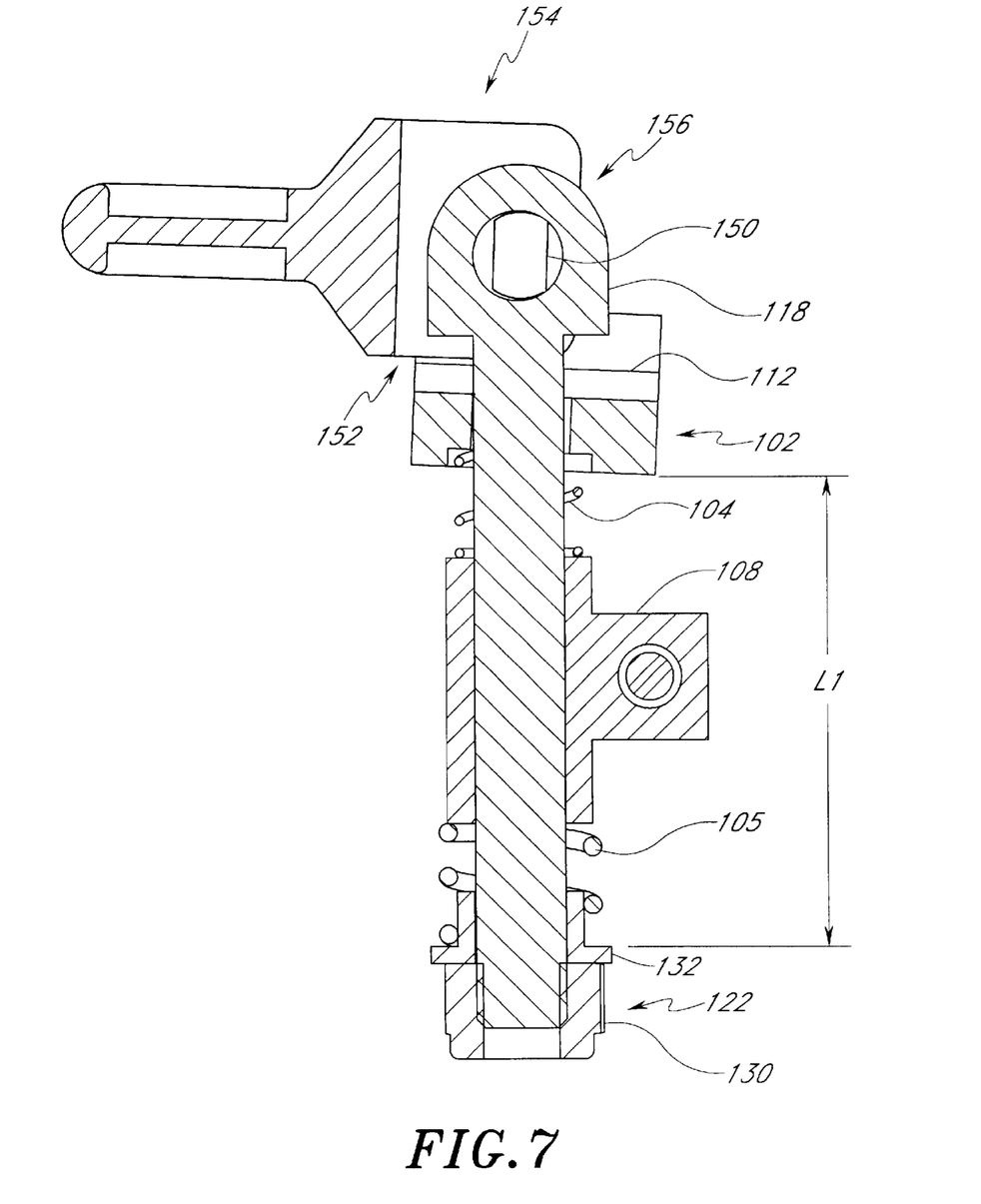
FIG. 7 is a cross-section taken through line 7—7 of FIG. 5 with the wire feeding apparatus in a first position.

As mentioned above, the adjustable spacer 110 of the illustrated arrangement is configured to be rotatably mounted on the first stop 118. As such, the adjustable spacer 110 preferably includes a pivot, which in the illustrated arrangement comprises a pair of shafts 150 aligned, with each other. In the assembled state, the shafts 150 extend, at least partially, through the through hole 126 of the first stop 118 (see also FIG. 7). The adjustable spacer 110 preferably also defines a first contact surface 152 and a second contact surface 154. More preferably, the spacer also defines a third contact surface 156.

In the illustrated arrangement, the shafts 150 are preferably located off-center with respect to the first, second and third contact surfaces 152, 154, 156. That is, the distances D1, D2, and D3 between the first, second and third contact surfaces and the center axis 153 of the shaft 150 are preferably all different. More preferably, D1 is greater than D2, which is greater than D3.

With reference now to FIG. 3 and FIGS. 7–9, the movement of the adjustable spacer 110 will now be explained. In the first position (FIG. 7), the first contact surface 152 contacts the contact surface 112 of the secondary member 42. This effectively reduces the length of the shaft 106 to a first length, L1. At this length, the first and second bias members 104, 105 are compressed a specific amount, which produces the first engagement force. Specifically, in the illustrated arrangement, the second bias member 105 is compressed and thus pushes upward on the third frame 108 and downward on the second stop 122. This pulls first contact surface 152 downward against the contact surface 112 of the secondary same 42 and correspondingly biases the idler surface 66 against the driver surface 65. The first bias member 104 is also compressed and thus pushes upward on the secondary frame 42 and downward on the third frame 108. This tends to push the idler surface 66 away from the driver surface 64. As such. the first engagement force is determined by the combination of the force exerted by the second biasing member 105 on the secondary frame 42 and the force exerted by the first biasing member 104 on the secondary fame 42. This force can be adjusted by adjust the size and strength of the first bias member 104 and the second bias member 105 in light of the first length L1 and the space occupied by the third frame 108. As mentioned above, in the preferred agreement the first bias member 104 and the second bias member 105 preferably are chosen to produce a first engagement force that is particularly suitable for steel-type filler wires. It should also be appreciated that the first engagement force can be adjusted by adjusting the position of the second stop 112. That is, by moving the position of the nut 130 on the shaft 106, the first length L1 can be adjusted thereby adjusting the fist engagement force.

In a modified arrangement, the first and the second bias members can be arranged such that, when the adjustable spacer is in the first position, the first and second bias members are in tension. In such an arrangement, the first bias member can be arranged to pull down on the secondary frame and the second bias member can be arranged to pull upwardly on the second end. Moreover, in such an arrangement, the biasing force created by the first bias member should be greater than the biasing force created by the second bias member.

In the illustrated arrangement, the first bias member 104 and the second bias member 105 act in opposite directions on the secondary frame 42. However, in yet another modified arrangement, the first and second bias members can be configured to operation in the same directions on the secondary frame. In such an arrangement, the first bias member can be in tension and configured to pull down on the secondary frame while the second bias member can be in compression and configured to push down on the second end of the shaft. Nevertheless, the illustrated arrangement is preferred because the first bias member 104 provides a return force, which facilitates the movement of the bias device 100 between preset conditions. In still yet another modified arrangement, the bias device can be configured with only one bias member or more than two bias members.

With reference back to FIGS. 6A–6F, the adjustable spacer 110 preferably is connected to an actuator 160, which provides a place for the operator to grip and move the adjustable spacer 110. The actuator 160 preferably also forms a lever arm, which facilities the rotation of the adjustable spacer 110. In the preferred arrangement, the actuator 160 and the adjustable spacer 110 are integrally formed. The actuator 160 preferably includes visual indicia 162 that indicate the position of the adjustable spacer 110. In the preferred arrangement, the first position produces the first engagement force, which is particularly suitable for filler wire made of steel. As such, the visual indicia 162 indicates "STEEL" on the side of the adjustment member 162 that preferably faces the user when the adjustable spacer 110 is in the first position.

Figure 8:
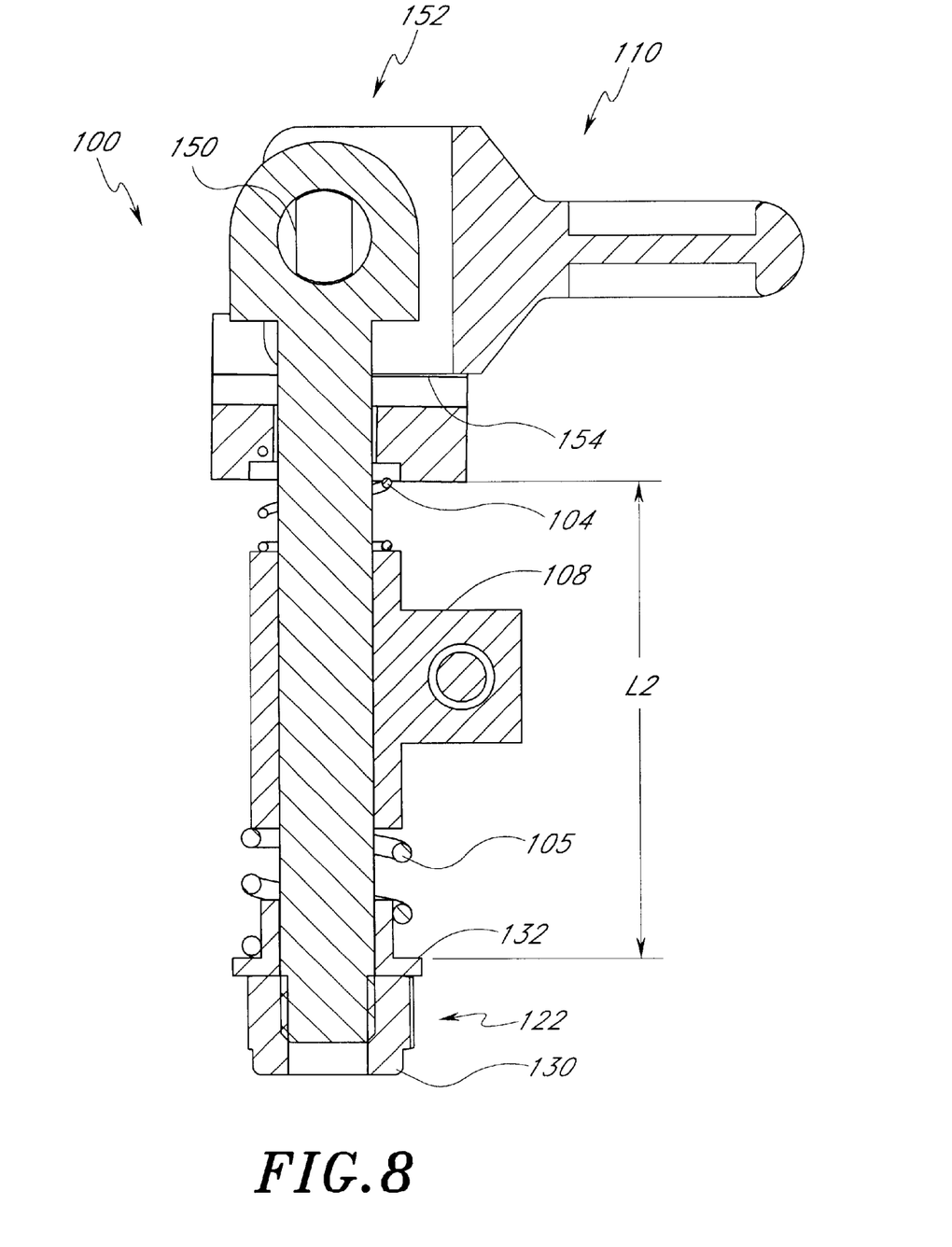
FIG. 8 is a cross-section taken through line 7—7 of FIG. 5 with the wire feeding apparatus in a second position.

FIG. 8 shows adjustable spacer 110 in the second position. In this position, the second contact surface 154 contacts the contact surface 112 of the secondary member 42. This effectively reduces the length of the shaft 106 to a second length, L2, which is preferably longer than the first length L1. At this length, the first and second bias members 104, 105 are compressed a different amount as compared to the first position. This produces the second engagement force, which is different (preferably less) than the first engagement force. With reference to FIG. 3, as with the first position the second position (indicated by dashed lines), the idler roll 46 preferably contacts the driver roll 44. As such, movement of the idler roll 46 away from the driver roll 44 tends to compress the second biasing member 105 and decompress the first biasing member 104.

As with the first position, the second engagement force is determined the combination of the force exerted by the second biasing member 105 on the secondary frame 42 (through the shaft 106) and the force exerted by the first biasing member 104 on the secondary frame 42. This force can be adjusted by adjusting the size and strength of the first bias member 104 and the second bias member 105 in light of the second length L2 and the space occupied by the mount 108. As mentioned above, in the preferred arrangement the first bias member 104 and the second bias member 105 preferably are chosen to produce a first engagement force that is particularly suitable for aluminum-type filler wires. As such, the visual indicia 162 indicates "ALUM" on the side of the adjustment member 162 that faces the user when the adjustable spacer 110 is in the second position.

Figure 9:
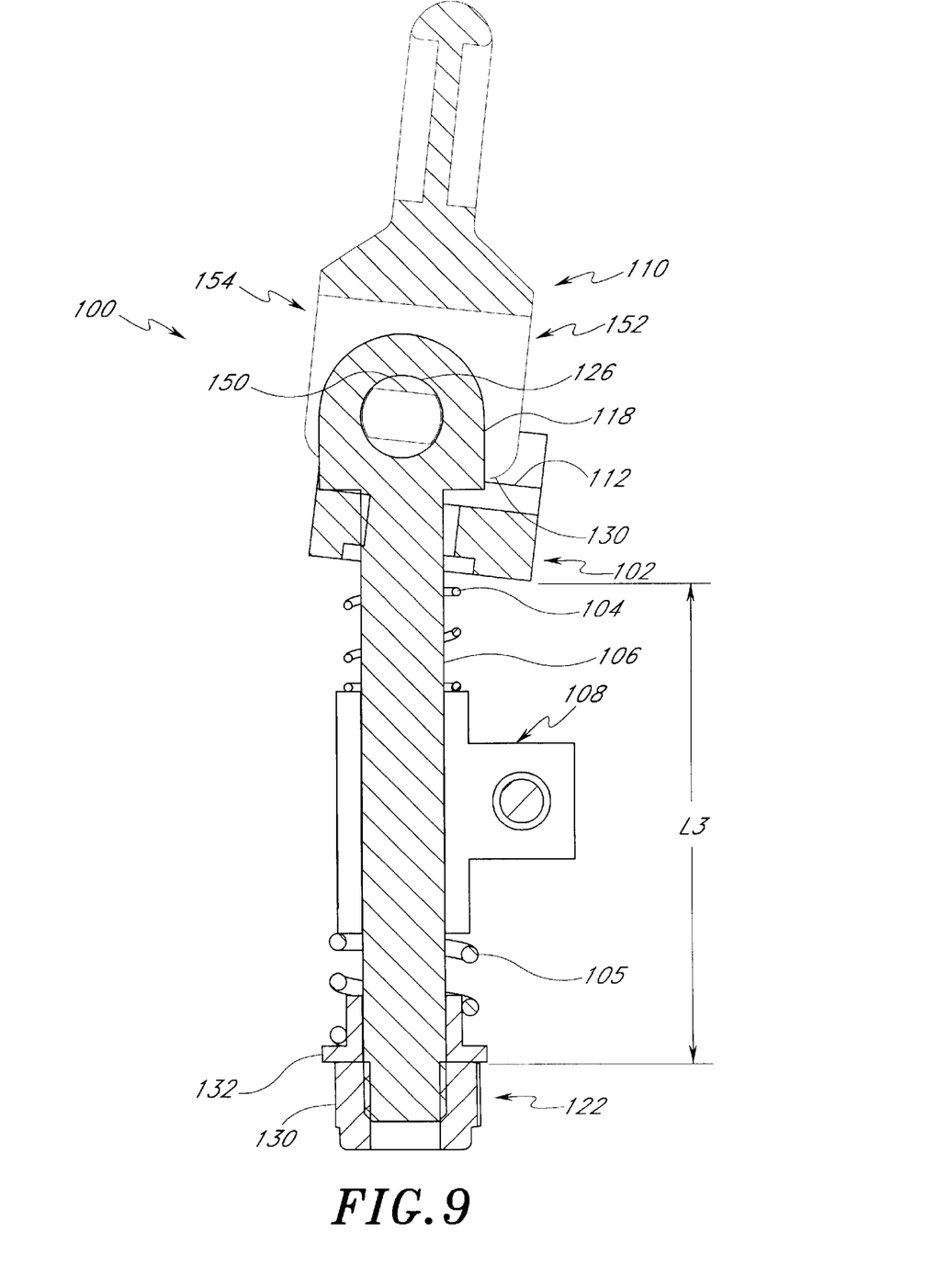
FIG. 9 is a cross-section taken through line 7—7 of FIG. 5 with the wire feeding apparatus in a third position.

FIG. 9 shows the adjustable spacer 110 in the third or "open" position. In this position, the third contact surface 156 contacts the contact surface 112 of the secondary member 42. In a modified arrangement, the third contact surface can be configured such that in the third position the first stop contacts the contact surface of the secondary frame. In the third position, the shaft 106 has a third length, L3. Preferably, at this length, the second bias members 105 is in a relaxed state (i.e., it does not exert a biasing force on the secondary member 42). In contrast, the first bias member 104 is preferably still slightly compressed such that an upward force is still being exerted on the secondary member 42. This upward force keeps the idler roll 46 distanced from the driver roll 44 and provides a "return" force that facilities movement from the first or second position to the third position. In a modified arrangement, the first bias member 104 can also be in a relaxed state when the adjustable spacer 110 is in the third position. As mentioned above, it should be appreciated that in a modified arrangement, the biasing device 100 and adjustable spacer 110 can be configured to move only between the first position and this open position.

In use, the operator begins by placing the spool 16 of filler wire 18 into the wire feeding unit 10. The operator loosens an end of the wire 18 and cuts off any kinked or bent portions. The operator then routes the end of the wire through an inlet 170 of the wire feeding apparatus 20, which in the illustrated arrangement extends through the mount 108. Preferably, the operator has already positioned the adjustable spacer 110 in the third position so that the idler roll 46 is distanced from the drive roll 44. The operator continues to route the wire 18 through the wire feeding apparatus 20 until the end of the wire enters the conduit 22, which is the illustrated arrangement is secured to the wire feeding apparatus by a thumb screw 172. At this point, the operator can apply an engagement force to the filler wire 18 by moving the adjustable spacer 110 into either the first or second positions, which in the illustrated arrangement correspond to steel and aluminum filler wires.

This arrangement has several advantages over the prior art. For example, because the engagement forces can be predetermined by the manufacture of the wire feed apparatus 20, there is little room for human error in the setting of the engagement force. In fact, the visual indicia 162 on the apparatus ensures that the operator uses the proper engagement force. The illustrated wire feed apparatus 20 is also easy to operate as compared to the prior art. The operator merely needs to flip the adjustment spacer 110 to change the engagement force from a first amount to a second amount.

There are several modifications that can be made to the illustrated wire feed apparatus 20. For example, in the illustrated arrangement, the shaft 106 extends through the second end 102 of the secondary frame 42. Moreover, the contacting surfaces 112 are provided on both sides of the through hole 114. In a modified arrangement, the shaft 106 can extend adjacent the second end such that the shaft does not extend through the second end. In such an arrangement, the second end does not include a through hole and preferably includes only one contacting surface.

In the illustrated arrangement, the second end 102 of the secondary frame is located on the other side of the idler roll 46 opposite the first end 72. In a modified arrangement, the second end can be located between the first end and the idler roll. In yet another modified arrangement, the secondary frame can extend on the other side of the pivot shaft 70 and the second end can be located on that side. In such an arrangements, the biasing arrangement of the bias members 104, 105 can be adjusted accordingly. It should also be appreciated that although in the illustrated arrangement, the biasing members act on the idler roll 46 through the secondary frame 42 and idler shaft 68, in modified arrangements, the biasing member can be configured to act directly on the idler shaft and/or act on the idler shaft through the first or second end of the shaft, which can be directly connected to the idler shaft.

In the illustrated arrangement, the adjustable spacer 110 is located at the first end 118 of the shaft. However, in modified arrangements the adjustable spacer 110 can be located at the second end of the shaft and correspondingly the washer and nut can be located at the first end. In another modified arrangement, the adjustable spacer can be modified to lie adjacent the mount 108. In still yet another arrangement, the adjustable spacer can lie outside the first or second stop (i.e., not between the first and second stop). In such an arrangement, one of the first or second stop preferably is arranged to move with respect to said shaft. It should also be appreciated that even though the illustrated adjustable spacer 110 operates to shorten the effective length of the shaft 106, in modified arrangements, the adjustable spacer can also be configured to increase the length of the shaft.

In the illustrated arrangement, the bias device 100 and the adjustable spacer 100 is moveable between a first, second and third preset conditions. In the first and second preset conditions, an engagement force is created between the idler roll 46 and the driver roll 44. In the third or "open" preset condition, the idler roll 46 is distanced from the driver roll 44. However, it should be appreciated that in a modified arrangement, the bias device 100 and adjustable spacer can be configured to move only between the first preset condition and the third or "open" position. Of course in other modified arrangements, the bias device 100 and the adjustable spacer can be moveable between more than the three preset conditions described above.

It also should be noted that certain objects and advantages of the invention have been described above for the purpose of describing the invention and the advantages achieved over the prior art. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

Moreover, although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. In addition, while a number of variations of the invention have been shown and described in detail, other modifications, which are within the scope of this invention, will be readily apparent to those of skill in the art based upon this disclosure. For example, it is contemplated that various combination or subcombinations of the specific features and aspects of the embodiments may be made and still fall within the scope of the invention. Accordingly, it should be understood that various features and aspects of the disclosed embodiments can be combined with or substituted for one another in order to form varying modes of the disclosed invention. Thus, it is intended that the scope of the present invention herein disclosed should not be limited by the particular disclosed embodiments described above, but should be determined only by a fair reading of the claims that follow.

What is claimed is:

1. A welding filler wire feed apparatus for feeding filler wire to a welding gun, comprising:
    A main frame;
    A secondary frame configured to move relative to said main frame;
    A first wheel that defines a first contact surface for contacting a first side of a filler wire, said first wheel being supported by said main frame;
    A second wheel that defines a second contact surface for contacting a second side of said filler wire, said second surface generally opposing said first contact surface, said second wheel being supported by said secondary frame;
    A motor connected to at least one of said first wheel and said second wheel so as to selectably drive said at least one of said first wheel and said second wheel;
    A bias controller including a first bias member that biases the secondary frame such that the second contact surface is biased towards said first contact surface, said bias controller having a first preset feed position and a second preset feed position, wherein in said first feed preset position the first bias member exerts a first force on said secondary frame corresponding to a force desired to feed a first type of filler wire and in said second preset feed position, said first bias member exerts a second force on said secondary frame corresponding to a force desired to feed a second type of filler wire, wherein said first force is greater than said second force, further comprising indicia on said bias controller that indicates when said bias controller is in said first preset feed position and when said bias controller is in said second preset feed position.

2. The apparatus of claim 1, wherein said bias controller further includes a third preset position wherein said first bias member is in a relaxed state and does not exert a force on said secondary member.

3. The apparatus of claim 1, wherein said bias controller includes a shaft having a first end and a second end, the shaft further including a first stop proximate said first end and a second stop proximate said second end, said shaft extending at least partially through a mount, said first bias member extending in a biasing direction along said shaft and being located between said mount and one of said first stop and said second stop, an adjustable spacer, the adjustable spacer being configured such that when said bias controller is in said first position the adjustable spacer occupies a first distance in the biasing direction and forces the first bias member to assume a fist length and when said bias controller is said second position the adjustable spacer occupies a second distance in the biasing direction and forces said first bias member to assume a second length.

4. The apparatus as in claim 3, wherein said first length is smaller than said second length.

5. The apparatus as in claim 3, wherein said first bias member is located between said first stop and said mount and the apparatus further includes a second bias member that is located between said second stop and said mount.

6. The apparatus as in claim 3, wherein said adjustable spacer comprises a cam pivotally connected to said shaft, said cam including a first cam surface and a second cam surface and wherein said bias controller is in said first position at least a portion of said first cam surface contacts the secondary frame, and when said bias controller is in second position at least a portion of said second cam surface contacts the secondary frame.

7. The apparatus as in claim 6, wherein said bias controller further includes a third preset position wherein said first surface is distanced from said second surface wherein said cam includes a third cam surface and wherein when said bias controller is in said third preset position said third cam surface at least partially contacts the second frame.

8. The apparatus as in claim 3, wherein said shaft extends through said secondary frame and lies between said first stop and second stop.

9. The apparatus as in claim 1, wherein the first type of filler wire is made of steel and the second type of filler wire is made of aluminum.

10. A welding filler wire feed apparatus for feeding filler wire to a welding gun, comprising:
    A main frame;
    A secondary frame configured to move relative to said main frame;
    A first wheel that defines a first contact surface for contacting a first side of a filler wire, said first wheel being supported by said main frame;
    A second wheel that defines a second contact surface for contacting a second side of said filler wire, said second surface generally opposing said first contact surface, said second wheel being supported by said secondary frame;

A motor connected to at least one of said first wheel and said second wheel so as to selectably drive said at least one of said first wheel and said second wheel;

A bias controller including a fist bias member that biases the secondary frame such that the second contact surface is biased towards said first contact surface, said bias controller comprising a pivotable cam, said cam having a first preset position and a second preset position, said apparatus configured such that when said cam is proximate said first preset position said cam is urged towards the first preset position and movement of said cam from said first preset position is resisted, said apparatus configured such that when said cam is proximate said second preset position said cam is urged toward said second position and movement of said cam from said second position is resisted.

11. The apparatus of claim 10, further comprising indicia on said bias controller that indicates said first preset position.

12. The apparatus of claim 10, wherein in said second preset position said first bias member is in a relaxed state.

13. The apparatus of claim 12, wherein said bias controller further includes a second bias member that biases the secondary frame such that said second surface is biased away from said first surface.

14. The apparatus of claim 13, wherein when said bias controller is in said second position said second bias member exerts a second force on said secondary frame such that said second surface is biased away from said first surface.

15. The apparatus of claim 10, wherein said bias controller includes a shaft having a first end and a second end, the shaft further including a first stop proximate said first end and a second stop proximate said second end, said shaft extending at least partially through a mount, said first bias member extending in a biasing direction along said shaft and being located between said mount and one of said first stop and said second stop said apparatus being configured such that when said cam is in said first position the cam occupies a first distance in the biasing direction and forces the first bias member to assume a first length and when said cam is said second position the cam occupies a second distance in the biasing direction such that said first bias member to assumes a second length.

16. The apparatus as in claim 15, wherein said first length is smaller than said second length.

17. The apparatus as in claim 15, wherein said first bias member is located between said first stop and said mount and the apparatus further includes a second bias member that is located between said second stop and said mount.

18. The apparatus as in claim 15, wherein said cam is pivotally connected to said shaft, said cam including a first cam surface and a second cam surface and wherein when said cam is in said first position at least a portion of said first cam surface contacts the secondary frame, and when said cam is in second position at least a portion of said second cam surface contacts the secondary frame.

19. The apparatus of claim 10, wherein said cam has a third preset position, said apparatus configured such that when said cam is proximate said third position said cam is urged toward said third position and movement of said cam from said third position is resisted.

20. A welding filler wire feed apparatus for feeding filler wire to a welding gun, comprising:

A main frame;

A secondary frame configured to move relative to said main frame;

A first wheel that defines a first contact surface for contacting a first side of a filler wire, said first wheel being supported by said main frame;

A second wheel that defines a second contact surface for contacting a second side of said filler wire, said second surface generally opposing said first contact surface, said second wheel being supported by said secondary frame;

A motor connected to at least one of said first wheel and said second wheel so as to selectably drive said at least one of said first wheel and said second wheel;

A bias controller including a first bias member that biases the secondary frame such that the second contact surface is biased towards said first contact surface, said bias controller comprising a pivotable cam, said cam having a first preset position, a second preset position and a third preset position, said apparatus configured such that (1) when said cam is proximate said first position said cam is urged toward said first position, (2) when said cam is proximate said second position said cam is urged toward said second position, and (3) when said cam is proximate said third position said cam is urged toward said third position.

21. The apparatus of claim 20, further comprising indicia on said bias controller that indicates said first position and said second position.

22. The apparatus of claim 20, wherein in said second present position, said first bias member is in a relaxed state.

23. The apparatus of claim 22, wherein said bias controller further includes a second bias member that biases the secondary frame such that said second contact surface is biased away from said first contact surface.

24. The apparatus of claim 23, wherein when said bias controller is in said second position said second bias member exerts a second force on said secondary frame such that said second contact surface is biased away from said first contact surface.

25. The apparatus of claim 20, wherein said bias controller includes a shaft having a first end and a second end, the shaft further including a first stop proximate said first end and a second stop proximate said second end, said shaft extending at least partially through a mount, said first bias member extending in a biasing direction along said shaft and being located between said mount and one of said first stop and said second stop, said apparatus being configured such that when said cam is in said first position the cam occupies a first distance in the biasing direction and forces the first bias member to assume a first length and when said cam is said second position the cam occupies a second distance in the biasing direction such that said first bias member to assumes a second length.

26. The apparatus as in claim 25, wherein said first length is smaller than said second length.

27. The apparatus as in claim 25, wherein said first bias member is located between said first stop and said mount and the apparatus further includes a second bias member that is located between said second stop and said mount.

28. The apparatus as in claim 25, wherein said cam is pivotally connected to said shaft, said cam including a first cam surface and a second cam surface and wherein when said cam is in said first position at least a portion of said first cam surface contacts the secondary frame, and when said cam is in second position at least a portion of said second cam surface contacts the secondary frame.

* * * * *